US012664242B2

(12) United States Patent
Okada et al.

(10) Patent No.: US 12,664,242 B2
(45) Date of Patent: Jun. 23, 2026

(54) INFORMATION PROCESSING DEVICE

(71) Applicant: TOYOTA JIDOSHA KABUSHIKI KAISHA, Toyota (JP)

(72) Inventors: Kazuya Okada, Tokyo (JP); Hiroshi Abe, Kasukabe (JP); Naoya Kaneko, Tokyo (JP); Toru Furusawa, Yokohama (JP); Takayuki Sakai, Tokyo (JP); Koji Takeoka, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/770,945

(22) Filed: Jul. 12, 2024

(65) Prior Publication Data

US 2025/0156509 A1    May 15, 2025

(30) Foreign Application Priority Data

Nov. 14, 2023    (JP) ................................. 2023-193924

(51) Int. Cl.
G06F 21/31            (2013.01)
(52) U.S. Cl.
CPC .................................... G06F 21/31 (2013.01)
(58) Field of Classification Search
CPC ..... H04W 12/06; H04W 12/04; H04W 12/08; H04W 4/40; H04L 63/0853; H04L 9/3226; G06F 21/31
See application file for complete search history.

(56) References Cited

U.S. PATENT DOCUMENTS

| | | | | |
|---|---|---|---|---|
| 11,216,001 B2 * | 1/2022 | Misu | ........................ | G06N 3/08 |
| 2016/0050269 A1 | 2/2016 | Botticelli | | |
| 2020/0301437 A1 * | 9/2020 | Misu | ..................... | B60W 10/20 |
| 2023/0029851 A1 | 2/2023 | Fujita | | |
| 2023/0192032 A1 * | 6/2023 | Schulz | .................. | B60R 25/245 |
| | | | | 340/5.72 |
| 2023/0196193 A1 * | 6/2023 | Knobloch | ............... | B60R 25/24 |
| | | | | 706/12 |
| 2024/0051582 A1 * | 2/2024 | Engstrom | .............. | G08G 1/167 |
| 2024/0096139 A1 * | 3/2024 | Mesde | ................... | G06Q 50/40 |

FOREIGN PATENT DOCUMENTS

| | | |
|---|---|---|
| JP | 2022-154775 A | 10/2022 |
| JP | 2023-018517 A | 2/2023 |
| KR | 10-2021-0117030 A | 9/2021 |

* cited by examiner

*Primary Examiner* — Hosuk Song
(74) *Attorney, Agent, or Firm* — SoraIP, Inc.

(57)            ABSTRACT

A control unit configured to execute: acquiring a usage purpose and authentication information of a model from a terminal of a user; extracting one or more first sensing data available to the user based on the authentication information from a storage unit storing a plurality of sensing data acquired from a plurality of vehicles; generating a model according to the usage purpose of the user using the extracted first sensing data; and providing the generated model to the terminal of the user.

3 Claims, 5 Drawing Sheets

STORAGE UNIT

VEHICLE INFORMATION DB 321

| VEHICLE ID | DATE AND TIME | POSITION | COMMUNI- CATION LINE | COMMUNI- CATION QUALITY |
|---|---|---|---|---|
| × × × | × × × | × × × | × × × | × × × |

USER INFORMATION DB 322

| USER ID | AUTHENTI- CATION INFORMA- TION | PURPOSE OF USE | AVAILABLE DATA |
|---|---|---|---|
| × × × | × × × | × × × | × × × |

INFORMATION PROCESSING DEVICE

CROSS-REFERENCE TO RELATED APPLICATION

This application claims priority to Japanese Patent Application No. 2023-193924 filed on Nov. 14, 2023, incorporated herein by reference in its entirety.

BACKGROUND

1. Technical Field

The present disclosure relates to an information processing device.

2. Description of Related Art

There is known an event optimization system that executes simulation with respect to a city, using a digital twin (e.g., Japanese Unexamined Patent Application Publication No. 2022-154775 (JP 2022-154775 A)).

SUMMARY

An object of the present disclosure is to provide a simulation model corresponding to a purpose of usage by a user.

One aspect of the present disclosure is an information processing device that includes a control unit configured to execute: acquiring a purpose of usage and authentication information of a model from a terminal of a user;

extracting, from a storage unit that stores a plurality of pieces of sensing data acquired from a plurality of vehicles, one or more pieces of first sensing data available for usage to the user, based on the authentication information;

generating a model in accordance with the purpose of usage by the user, using the first sensing data that is extracted; and providing the model that is generated to the terminal of the user.

Another aspect of the present disclosure is an information processing method in which a computer executes processing in the information processing device, a program for causing the computer to execute the information processing method, and a storage medium storing the program in a non-transitory manner.

According to the present disclosure, a simulation model corresponding to a purpose of usage by a user can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating a table configuration of the vehicle information DB and the user information DB;

DETAILED DESCRIPTION OF EMBODIMENTS

Figure 1:
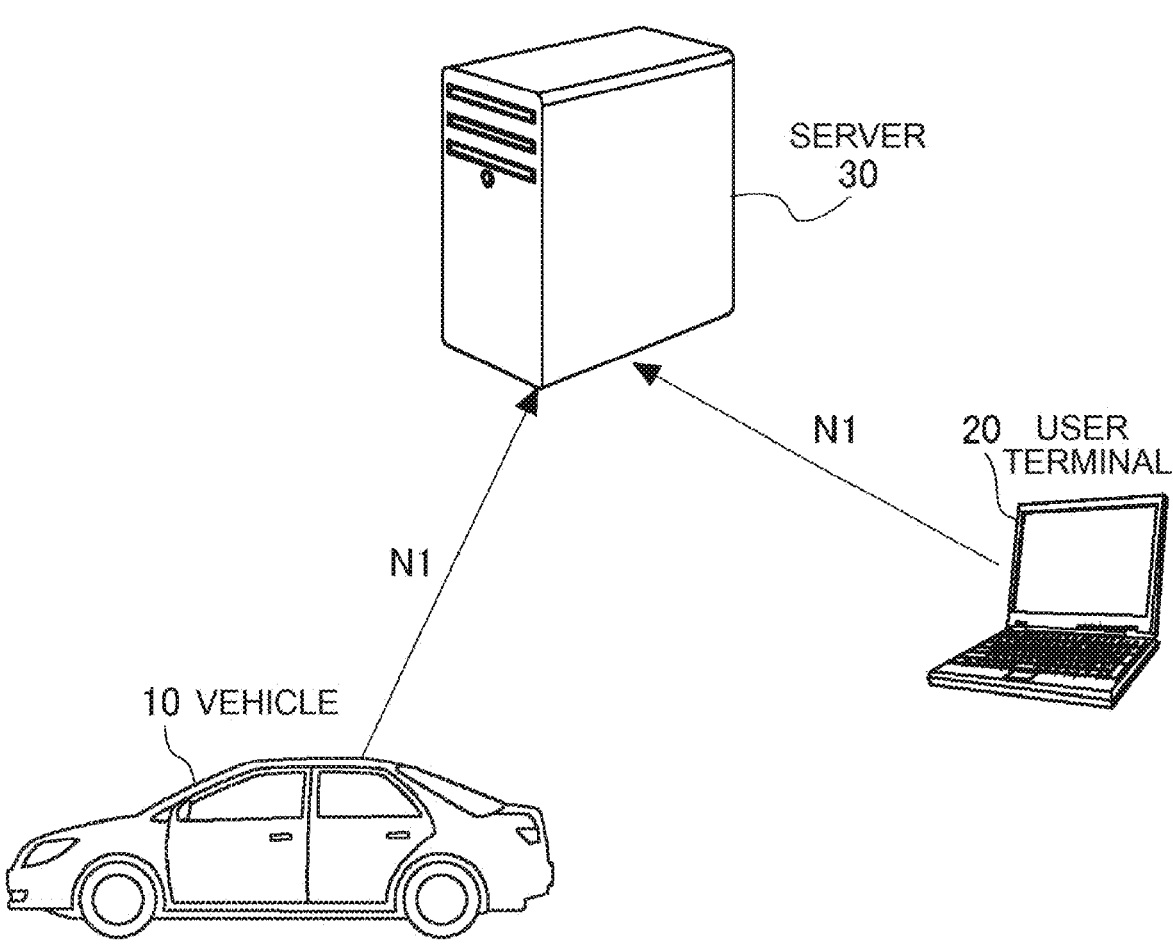
FIG. 1 is a schematic diagram of a system according to an embodiment.

Conventionally, it is assumed that the same user collects data for a simulation model and uses the data. It has not been envisioned and contemplated to have third parties or other organizations utilize digital twin/simulations based on data collected by one user.

Therefore, the control unit acquires the purpose of use of the model and the authentication information. The user may be a pre-registered user. The purpose of use of the model may be selected by the user from among predetermined items. The purpose of using the model is, for example, to test an in-house developed application on a simulation. In addition, revenue and operating conditions in car sharing are simulated, and the effect of improving the strength of radio waves is verified by temporarily placing communication base stations on the simulation. The authentication information is information for confirming that the user is an authorized user, and may include, for example, a user ID and a password.

The control unit extracts one or more pieces of first sensing data available to the user based on the authentication information from a storage unit that stores a plurality of pieces of sensing data acquired from a plurality of vehicles. The sensing data of the vehicle includes data detected by a sensor provided in the vehicle. The sensing data of the vehicle includes, for example, information related to a location, a communication line, a communication quality, and the like. The sensing data of the vehicle is transmitted from the vehicle to the information processing device. There are a plurality of vehicles that transmit sensing data. The sensing data is used in generating a model. The first sensing data is selected according to the authentication information. Note that the relationship between the authentication information and the first sensing data may be stored in advance in the storage unit.

For example, in a case where the user of car sharing is a user and a model for simulating an operation state of the vehicle is generated, sensing data of the vehicle managed by the user can be used. At this time, since information related to communication is unnecessary, it cannot be used. Further, for example, in a case where the mobile communication user is a user and a model for simulating an effect when the base station is arranged is generated, sensing data related to the base station managed by the user can be used. On the other hand, information about base stations of other users is not available. Further, for example, when a user who develops an in-vehicle application is a user and generates a model that simulates a communication situation when the vehicle is driven, sensing data that can determine continuation of communication can be used. That is, the communication line type, the radio wave intensity, and the information of the base station cannot be used.

The control unit generates a model according to the purpose of use of the user by using the extracted first sensing data. The model may be selected by the control unit according to the purpose of use of the model from among predetermined models. Then, the control unit provides the generated model to the terminal of the user. In this way, the collected sensing data can be provided as a model that is easy for a third party to use. In doing so, the available data can be managed appropriately. In addition, it is possible to appropriately protect privacy, personal information, and secret of the provider of the sensing data.

Hereinafter, embodiments of the present disclosure will be described with reference to the drawings. The configurations of the following embodiments are illustrative, and the present disclosure is not limited to the configurations of the embodiments. Further, the following embodiments can be combined as much as possible.

First Embodiment

FIG. 1 is a schematic diagram of a system 1 according to an embodiment. In the example of FIG. 1, the system 1 includes a vehicle 10, a user terminal 20 used by a user, and a server 30. There may be a plurality of vehicles 10 and a plurality of user terminals 20. The server 30 may include a plurality of servers. The vehicles 10, the user terminals 20, and the servers 30 are connected to each other by a network N1. The network N1 is, for example, a world-wide public communication network such as the Internet, and a wide area network (WAN) or other communication networks may be adopted. In addition, the network N1 may include a telephone communication network such as a mobile phone network and a wireless communication network such as Wi-Fi (registered trademark).

The vehicle 10 is a connected car that periodically transmits information such as a location, a communication line, and communication quality to the server 30. These pieces of information transmitted from the vehicle 10 to the server 30 are also referred to as vehicle information below. The user terminal 20 is a terminal used by a user. The user includes a developer of an application program (hereinafter, simply referred to as an application) related to the vehicle 10, a communication carrier that provides a communication service to the vehicle 10, and the like. The user performs registration in advance with respect to the server 30 via the user terminal 20. By this registration, authentication information corresponding to the user is generated. The credentials include, for example, user ID and passwords. Note that the registered information may include information on the purpose of use of the model.

In response to a request from a user (which may be the user terminal 20), the server 30 generates a model corresponding to the purpose of use and provides the model to the user (which may be the user terminal 20). The model is generated based on vehicle information transmitted from the plurality of vehicles 10.

Figure 2:
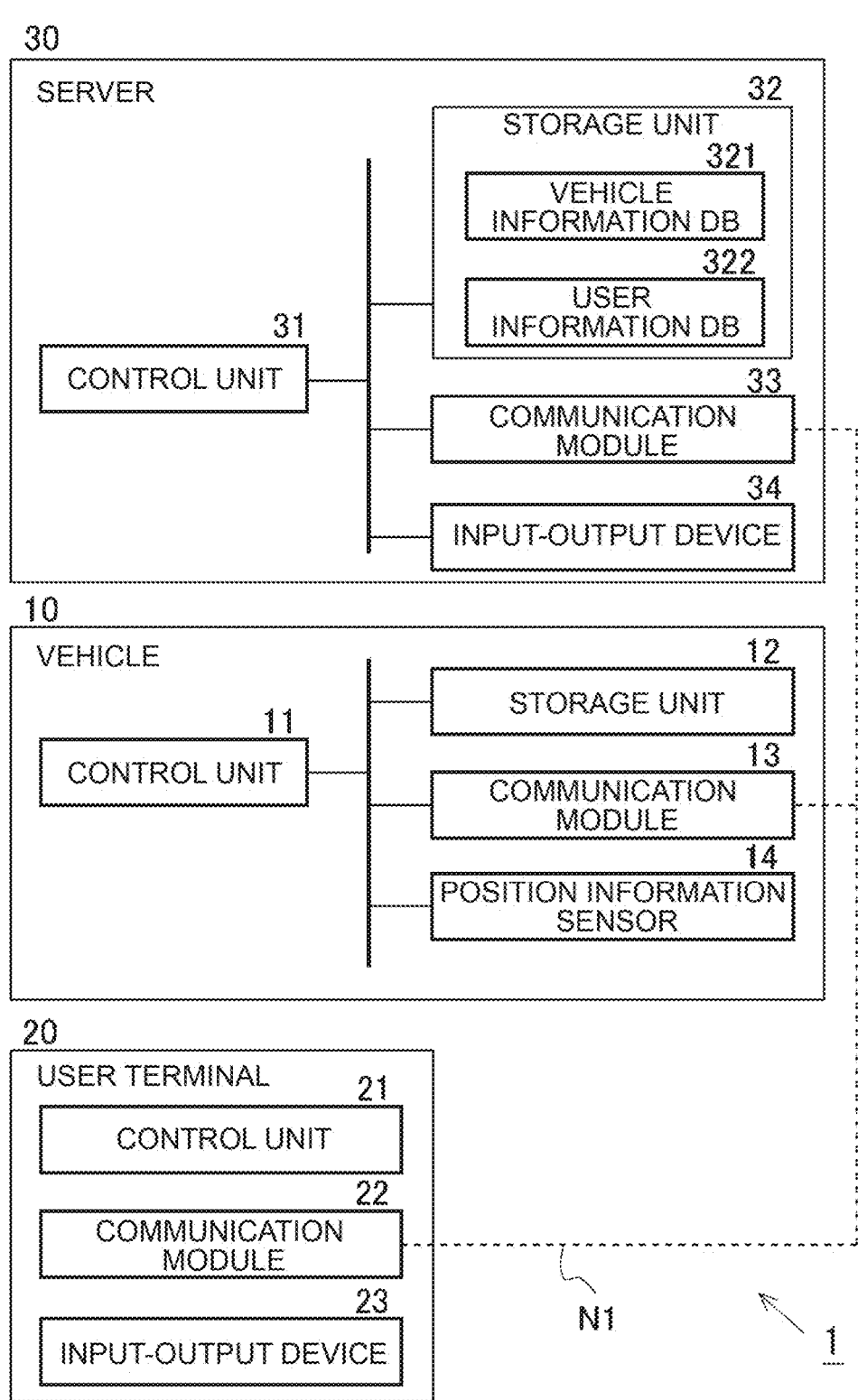
FIG. 2 is a block diagram schematically illustrating an example of configurations of a vehicle, a user terminal, and a server constituting the system according to the present embodiment.

FIG. 2 is a block diagram schematically showing an example of the configuration of each of the vehicle 10, the user terminal 20, and the server 30 constituting the system 1 according to the present embodiment. The server 30 includes a control unit 31, a storage unit 32, a communication module 33, and an input/output device 34.

The server 30 can be configured as a computer including a processor (such as a CPU, GPU), a main storage device (such as a RAM, ROM), and a secondary storage device (such as an EPROM, a hard disk drive, and a removable medium). The secondary storage device stores an operating system (OS), various programs, various tables, and the like. By executing the program stored therein, it is possible to realize each function (software module) that meets a predetermined purpose, as will be described later. However, some or all of the modules may be realized as hardware modules by, for example, hardware circuitry such as an ASIC, FPGA.

The control unit 31 is an arithmetic unit that realizes various functions of the server 30 by executing a predetermined program. The control unit 31 can be realized by, for example, a hardware processor such as a CPU. The control unit 31 may include a RAM, ROM, a cache memory, and the like. Details of the control unit 31 will be described later.

The storage unit 32 is a unit that stores information, and is configured by a storage medium such as a RAM, a magnetic disk, or a flash memory. The storage unit 32 stores a program executed by the control unit 31, data used by the program, and the like. In addition, a database (vehicle information DB 321 and user information DB 322) is constructed in the storage unit 32, and the information collected from the vehicle 10 and the information collected from the users are stored in the database.

FIG. 3 is a diagram illustrating a table configuration of the vehicle information DB 321 and the user information DB 322. The vehicle information DB 321 stores date and time information, position information of the vehicle 10, communication line information, and communication quality information in association with the vehicle ID. These pieces of information are collectively called vehicle information. The vehicle ID is identification information unique to the vehicle 10. The date and time information is information about the date and time when the vehicle information is transmitted from the vehicle 10 to the server 30. The position information is information related to the position of the vehicle 10 when the vehicle information is transmitted from the vehicle 10, and is, for example, information indicated by latitude and longitude. The communication line information is information related to a communication line used in the vehicle 10. The communication line information may be, for example, information related to a communication method such as 4G, 5G, Wi-Fi (registered trademark). The communication quality information is, for example, information on radio wave intensity. The communication quality information may be information on reference signal received power (RSRP), reference signal received quality (RSRQ). The communication-quality information may be information about signal-to-interference-plus-noise ratio (SINR). In addition, the communication quality information may include information on continuity (connected or disconnected) of communication. The vehicle information is transmitted from the vehicle 10 at a predetermined timing. The control unit 31 stores the vehicle information received from the vehicle 10 in the vehicle information DB 321.

In the user information DB 322, the authentication information, the use purpose information, and the available data information are stored in association with the user ID. The user ID is an identity unique to the user or the user terminal 20. The authentication information is information for authenticating the user, and is, for example, information related to a password, a password, or a PIN code. A user ID may be included in the credentials. In addition, identification information that differs from the user ID may be included in the authentication information. The purpose-of-use information is information related to a purpose of using vehicle information in a target company. The use purpose information is information for determining a model to be generated, and the control unit 31 generates a model according to the use purpose. The available data information is information about data available to the user. For example, the available data may be determined according to the contract content. For example, the data available to the user may be determined according to whether or not a confidentiality agreement for vehicle information is concluded or the content of the confidentiality agreement. The authentication information, the use purpose information, and the available data information associated with the user ID are also referred to as user information.

The communication module 33 is a communication interface for connecting the server 30 to the network N1. The communication module 33 may be configured to include, for example, a network interface board, a wireless communication interface for wireless communication, and the like. The server 30 can perform data communication with the vehicle 10 and the user terminal 20 via the communication module 33.

The input/output device 34 is a means for receiving an input operation performed by an operator and presenting information to the operator. Specifically, the input/output device 34 includes a device for inputting a mouse, a keyboard, or the like, and a device for outputting a display, a speaker, or the like. The input/output device 34 may be integrally formed of, for example, a touch panel display or the like.

Note that the specific hardware configuration of the server 30 can be omitted, replaced, or added as appropriate depending on the embodiment.

Next, the vehicle 10 will be described. The vehicle 10 includes a control unit 11, a storage unit 12, a communication module 13, and a position information sensor 14. These configurations may be realized by a combination of data communication module (DCM), a head unit, an in-vehicle device such as a car navigation system, and the like. The control unit 11 is an arithmetic unit that realizes various functions of the vehicle 10 by executing a predetermined program. The control unit 11 can be realized by, for example, a hardware processor such as a CPU. In addition, the control unit 11 may be configured to include a RAM, read only memory (ROM), a cache memory, and the like.

The storage unit 12 is a unit that stores information, and is configured by a storage medium such as a RAM, a magnetic disk, or a flash memory. The storage unit 12 stores a program executed by the control unit 11, data used by the program, and the like. The storage unit 12 stores a default value of SOH.

The communication module 13 is a communication unit for connecting the vehicle 10 to the network N1. In the present embodiment, vehicle 10 can communicate with other devices (for example, servers 30) over a network N1 using a mobile communication service such as 3G, LTE, 5G, 6G.

The position information sensor 14 acquires position information (for example, latitude and longitude) of the vehicle 10 at a predetermined cycle. The position information sensor 14 is, for example, a global positioning system (GPS) receiver, a radio communication unit, or the like.

The control unit 11 of the vehicle 10 collects vehicle information at predetermined time intervals and transmits the collected vehicle information to the server 30.

Next, the user terminal 20 will be described. The user terminal 20 includes a control unit 21, a communication module 22, and an input/output device 23. Since the communication module 22 and the input/output device 23 have the same configuration as that of the communication module 33 and the input/output device 34 of the server 30, description thereof will be omitted. The control unit 21 of the user terminal 20 acquires the purpose of use and authentication information of the model from the user via the input/output device 34. The use purpose of the model may be selected by the user from among a plurality of predetermined items. The user terminal 20 transmits the usage purpose and authentication information of the acquired model to the server 30.

Next, the control unit 31 of the server 30 will be described in detail. The control unit 31 of the server 30 generates a model based on the vehicle information acquired from the vehicle 10 and the user information acquired from the user terminal 20 in response to a request to use the model from the user. The request to use the model includes user information. Examples of the model include a model having connectivity to the Internet (hereinafter, referred to as a first model), a model having a time of power-on/power-off of a specific vehicle group, a vehicle type, and position information (hereinafter, referred to as a second model), and a model having detailed information of a specific mobile communication network (hereinafter, referred to as a third model).

Figure 4:
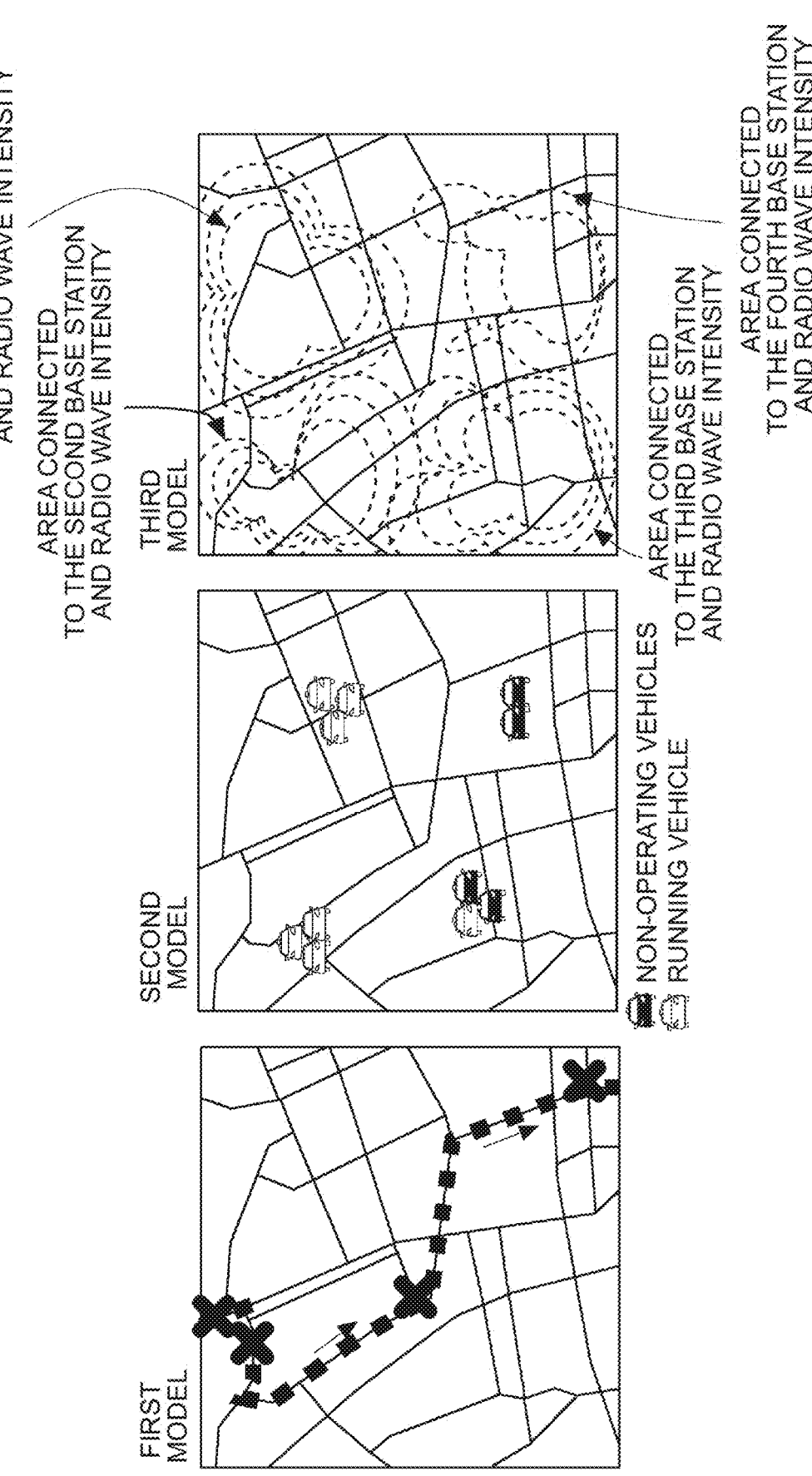
FIG. 4 is an illustration of a diagram for describing a model to be generated.

FIG. 4 is an example of a diagram for explaining a model to be generated. FIG. 4 shows a diagram corresponding to each of the first model, the second model, and the third model. The sensing data used in the first model is the presence or absence of a communication connection, and the first model is a model that reproduces the presence or absence of a communication connection for each position and for each time. The first model is, for example, a model that is assumed to be used by a developer of an in-vehicle application. In the diagram showing the first model of FIG. 4, the route when the vehicle 10 travels in the direction indicated by the arrow is indicated by a broken line, and the position where the communication is broken is indicated by a cross. In this case, the user uses the first model to test the app developed by the company on the simulation. For example, when the vehicle is simulated on a map, the communication status is reflected. In the case of such a usage mode, a test is established if only the connectivity (connected or disconnected) of communication is known. On the other hand, in the case of such a usage mode, information on the type of communication line, the radio wave intensity, the base station, and the like are not required. As described above, in the first model, since only the presence or absence of a communication connection is used, all data related to the presence or absence of a communication connection can be used regardless of the authentication information.

In addition, the sensing data used in the second model is an operation state of the share car, and the second model is a model that reproduces the position of the vehicle 10 per time. The second model is, for example, a model that is assumed to be used by an operator of a car sharing service. In the diagram showing the second model of FIG. 4, the filled vehicle indicates a vehicle (hereinafter, also referred to as a non-operating vehicle) in a power-off state at a specific position. An open vehicle indicates a vehicle (hereinafter, also referred to as an active vehicle) in a power-on state at a position that is not a specific position. The power-on state refers to a state in which the power switch is on, and may be an IG-ON state. In the power-on state, the vehicle 10 is in the activated state. The power-off state means that the power switch is in the off state, and may be IG-OFF state. The power-off state is a state in which the function of the vehicle 10 is stopped. The specific position is a position determined by the user as a parking lot of the vehicle 10. The non-operating vehicle and the operating vehicle are the vehicles 10 managed by the user. In this case, the user uses the second model to simulate the standby position of the vehicle 10, the number of standby vehicles, and the revenue or operation status when the vehicle type is changed. The user collects the operation status of the vehicle 10 used in car sharing, and performs a simulation using information obtained from the reservation application. In the case of such a usage mode, only specific information of a specific vehicle group corresponding to the user is required, and information related to communication is not required. In this way, in the second model, which vehicle 10 data is available is identified based on the authentication information, and only the identified vehicle 10 data is used.

The sensing data used in the third model is the base station to which the vehicle 10 is connected and the communication status thereof, and the third model is a model for reproducing the radio wave environment for each base station. The third model is, for example, a model that is assumed to be used by a mobile communication carrier. In the diagram showing the third model of FIG. 4, the communicable area corresponding to each of the first base station, the second base station, the third base station, and the fourth base station and the radio wave intensity thereof are indicated by broken lines. The broken line is a line connecting the positions where the radio wave intensities are equal. The radio wave intensity becomes stronger in the area on the center side. In this case, the user uses the third model, for example, when searching for a hole (that is, a place where communication cannot be performed) in his/her mobile coverage on a simulation. For example, a simulation in which a base station is temporarily placed at a certain position may be performed to verify an improvement effect of mobile coverage. Also, for example, the availability of a service using the company's own infrastructure may be verified. In such a usage mode, information on the strength of radio waves and the status of connectivity in communication by the user is required, and information on communication by other companies or information on Wi-Fi (registered trademark) is not required. As described above, in the third model, it is determined which base station data is available based on the authentication information, and only the data of the identified base station is used.

The control unit 31 of the server 30 generates a model based on the vehicle information acquired from the vehicle 10 and the user information acquired from the user terminal 20 in response to a request to use the model from the user. When a request to use a model is received from the user terminal 20, a process of authenticating the user terminal 20 is performed. The control unit 31 performs an authentication process by collating the authentication information received from the user terminal 20 with the authentication information stored in the user information DB 322. When the authentication is successful, the control unit 31 extracts a usage target corresponding to the user ID from the user information DB 322. The user information DB 322 may be stored in advance, or may be included in a request to use a model. Then, the control unit 31 generates a model according to the purpose of use. The control unit 31 generates a model by anonymizing or eliminating vehicle information used for generating the model based on the authentication information. At this time, for example, any one of the first model, the second model, and the third model may be generated. After generating the model, the control unit 31 stores the model in the storage unit 32 so as to be usable by the user. Further, the control unit 31 may transmit the generated model to the user terminal 20. A known technique can be used to generate a model.

Figure 5:
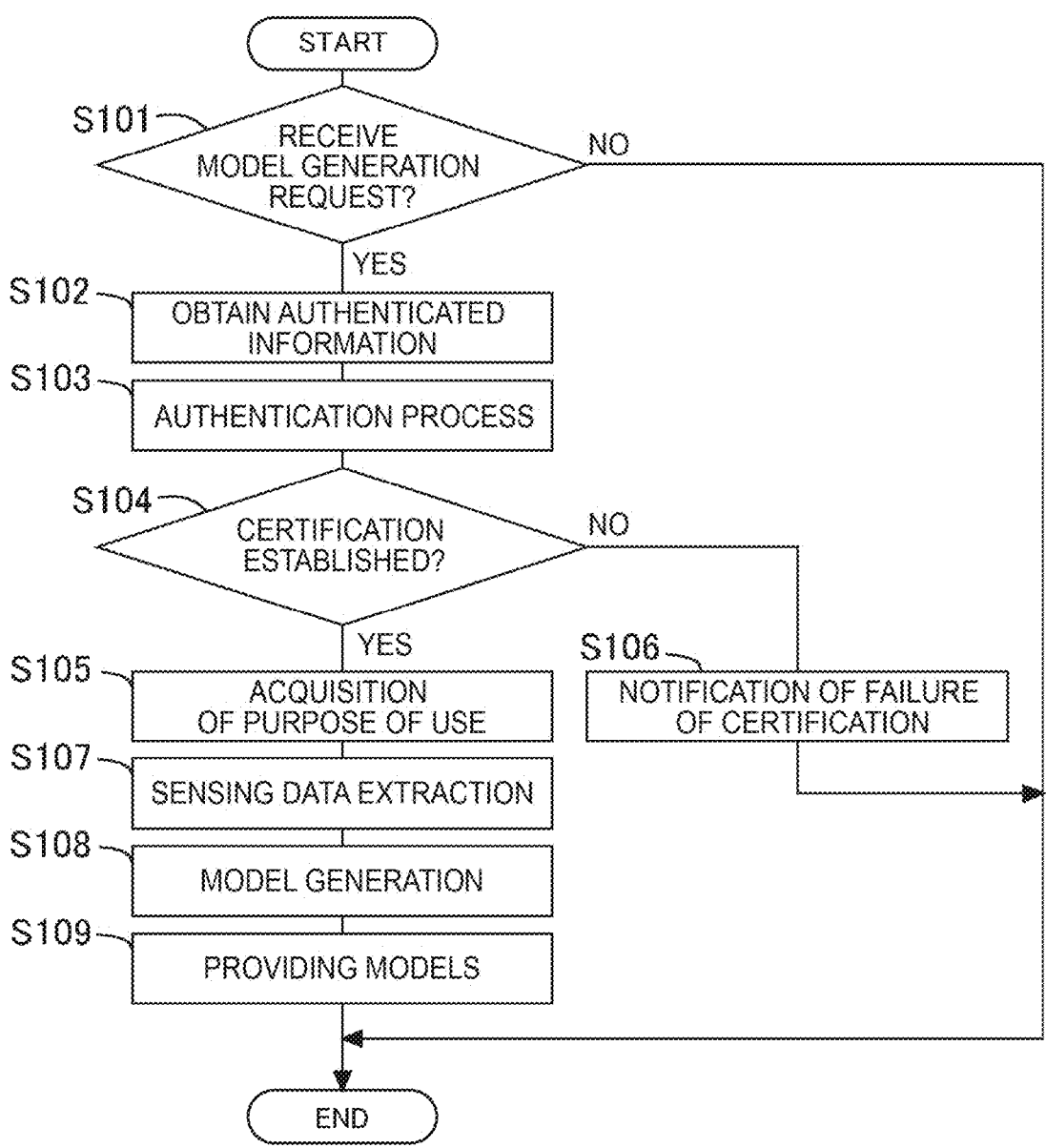
FIG. 5 is a flowchart illustrating a process of generating a model in the server.

FIG. 5 is a flowchart illustrating a process of generating a model in the server 30. The flowchart illustrated in FIG. 5 is executed in the server 30 at predetermined time intervals. Note that the vehicle information DB 321 and the user information DB 322 will be described on the assumption that the required information is already stored.

In S101, the control unit 31 determines whether or not the user terminal 20 has received a model-generation request. If the control unit 31 makes an affirmative determination in S101, the process proceeds to S102, and if a negative determination is made, the routine ends.

In S102, the control unit 31 acquires the authentication information. The control unit 31 acquires the user ID and the authentication information included in the model-generation request. In S103, the control unit 31 extracts the authentication information corresponding to the user ID from the user information DB 322 and compares the extracted authentication information with the authentication information acquired in S102 to execute the authentication process.

In S104, the control unit 31 determines whether or not the authorization has been established. If the control unit 31 makes an affirmative determination in S104, the process proceeds to S105, and if it makes a negative determination, the process proceeds to S106. In S106, the control unit 31 notifies the user terminal 20 that the authentication is not established. On the other hand, in S105, the control unit 31 acquires the usage objective corresponding to the user ID included in the model-generation requirement from the user information DB 322. As another example, when the information on the purpose of use is included in the request for model generation, the control unit 31 may extract the information on the purpose of use from the request for model generation.

In S107, the control unit 31 extracts sensing data corresponding to the usage intent from the vehicle information DB 321. The control unit 31 extracts, from the vehicle information DB 321, sensing data corresponding to the usage purpose from the sensing data (that is, the available data stored in the user information DB 322) that is available to the user extracted based on the authentication information. The relationship between the purpose of use and the sensing data to be extracted is stored in advance in the storage unit 32. In S108, the control unit 31 generates a model based on the extracted sensing data. In S109, the control unit 31 provides a model to the user terminal 20. The providing of the modeling may be the providing of API (Application Programming Interface) or the providing of the coding. In addition, the control unit 31 may provide a simulation service using a model. That is, instead of providing the model, the control unit 31 may execute a simulation using the model and provide the result of the simulation to the user. In this case, the model generation request may include information necessary for executing the simulation.

As described above, according to the present embodiment, the collected data can be provided as a model that is easy for the user to use. At this time, since a model including only the minimum necessary information is generated and provided according to the purpose of use of the user, a model corresponding to the purpose of use of the user can be provided, and data can be appropriately managed. Also, the privacy of the data provider can be appropriately protected.

Other Embodiments

The above embodiments are only examples, and the disclosure may be carried out with various modifications without departing from the essence thereof. The processes and means described in the present disclosure can be freely combined and implemented as long as no technical contradiction occurs. Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

Although one server 30 has been described in the above embodiment, a plurality of servers may exist as another example. For example, it may include an authority management server that authenticates the user terminal 20 and its simulation instance, a collection server that collects vehicle information from the vehicle 10, and a database that stores vehicle information. A plurality of servers such as a model server that generates a simulation model and a simulation server that executes a simulation may be included. In the case of performing a simulation with this configuration, the simulation instance on the simulation server requests a simulation model from the model server. When requesting the simulation model, the model server notifies the authority management server of the authentication information of the user terminal. Based on the response of the authority management server, the model server anonymizes or eliminates the vehicle information used in the simulation, configures the model, and reflects the model in the simulation of the simulation server.

When using the model, the user may set what kind of statistical processing is to be performed, such as daily, monthly, weekday, and weekend. For example, the model generation request may include a request for such a setting.

The disclosure can also be implemented by providing a computer program in which the functions described in the embodiments are implemented to a computer, and by one or more processors included in the computer reading and executing the program. Such a computer program may be provided to the computer by a non-transitory computer-readable storage medium connectable to the system bus of the computer, or may be provided to the computer via a network. Non-transitory computer-readable storage media include, for example, magnetic disks (floppy (registered trademark) disks, hard disk drives (HDD), etc.). Non-transitory computer-readable storage media include, for example, any type of disk, such as an optical disk (CD-ROM, DVD disk, Blu-ray disk, etc.), read-only memory (ROM). Non-transitory computer-readable storage media include, for example, random access memory (RAM), EPROM, EEPROM, magnetic cards, flash memory, optical cards, any type of media suitable for storing electronic instructions.

What is claimed is:

1. An information processing device, comprising a control unit configured to execute:

acquiring a purpose of usage and authentication information of a model from a terminal of a user;

extracting, from a storage unit that stores a plurality of pieces of sensing data acquired from a plurality of vehicles, one or more pieces of first sensing data available for usage to the user, based on the authentication information;

generating a model in accordance with the purpose of usage by the user, using the first sensing data that is extracted; and providing the model that is generated to the terminal of the user wherein:

the first sensing data is presence or absence of a communication connection; and the model is a model that reproduces the presence or absence of communication connection for each location and for each time.

2. The information processing device according to claim 1, further comprising a storage unit for storing a relation between the purpose of usage of the model and the first sensing data, wherein the control unit extracts the first sensing data in accordance with the purpose of usage of the model.

3. An information processing device, comprising a control unit configured to execute:

acquiring a purpose of usage and authentication information of a model from a terminal of a user;

extracting, from a storage unit that stores a plurality of pieces of sensing data acquired from a plurality of vehicles, one or more pieces of first sensing data available for usage to the user, based on the authentication information;

generating a model in accordance with the purpose of usage by the user, using the first sensing data that is extracted; and providing the model that is generated to the terminal of the user wherein:

the first sensing data is a base station to which the vehicle connects, and a state of communication with the base station; and the model is a model that reproduces a radio wave environment for each base station.

*     *     *     *     *